E. C. DE SEGUNDO.
DEFIBRATION OF THE HULLS OF COTTON OR OTHER FIBER BEARING SEEDS.
APPLICATION FILED FEB. 28, 1918.
1,329,828.
Patented Feb. 3, 1920.
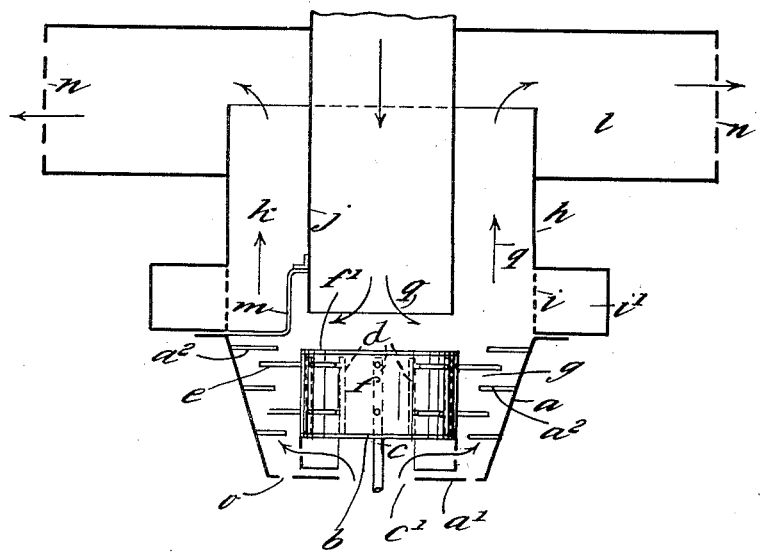
Witnesses:
Inventor
Edward C. DeSegundo
by
Attorney

UNITED STATES PATENT OFFICE.

EDWARD CARSTENSEN DE SEGUNDO, OF LONDON, ENGLAND.

DEFIBRATION OF THE HULLS OF COTTON OR OTHER FIBER-BEARING SEEDS.

1,329,828.   Specification of Letters Patent.   Patented Feb. 3, 1920.

Application filed February 28, 1918. Serial No. 219,716.

*To all whom it may concern:*

Be it known that I, EDWARD CARSTENSEN DE SEGUNDO, a subject of the King of Great Britain, residing in London, England, have invented certain new and useful Improvements Relating to the Defibration of the Hulls of Cotton or other Fiber-Bearing Seeds, of which the following is a specification.

My invention consists in an improved method of defibrating cotton seeds and other fiber-bearing material and for segregating and collecting the fibers detached by means involving the employment of defibrating devices that are rotated within a defibrating chamber and thereby cause a current of air to be induced that conveys away the detached fibers, the object being to enhance the efficiency of, and simplify, the process of detaching or liberating the fibers; of removing them from the defibrating chamber of the apparatus employed; of freeing them from dust and of collecting them in a depositing chamber, and also to promote economy in power consumption in carrying out the several steps of the treatment.

In order to attain the above-mentioned objects I mount the defibrating devices on upstanding arms or supports arranged in a circular row and carried by a disk-like member adapted to rotate about a substantially vertical axis within a defibrating chamber, which is preferably of a conical form tapering outwardly and upwardly. The supports for the defibrating devices are disposed with reference to the wall of the defibrating chamber so that a space or passage, into which the said devices project, is formed between them and the wall. Such space or passage constitutes the working or defibrating zone, and should preferably be wedge-shape in vertical cross-section so as to increase in cross sectional area in the upward direction, and thus afford greater freedom for the fibers separated from the material under treatment to be carried out of the machine continuously by an uprising current of air. The defibrating devices are themselves so shaped and arranged that, as they rotate about the axis of the chamber and act upon the material, they will, in conjunction with the current of air induced by the rotating parts, retard the movement of the material which is fed into the chamber, through the working zone, the defibrated material moving through the working zone toward a suitable outlet.

The inlet or inlets for the air for the induced or conveying air current are arranged so that air entering the chamber will, in obedience to the action of the rotating parts flow radially outward and into and upwardly through the defibrating zone, thereby passing through the mass of material under treatment and carrying away in a continuous manner the detached fibers, as soon as they are detached. Dust and other foreign matter are unavoidably present in cotton and other fiber bearing seed hulls as obtained in commerce, and some portion of such dust may be carried up along with the detached fibers by the uprising air current.

As part of the process and for the purpose of freeing the fibers from dust in a continuous manner as they are carried out of the defibrating chamber by the current of air, I provide in the machine, above that chamber, sieve-like screens or sifters inclosed by a chamber or compartment in which dust and other matter passing through the screens may be deposited. The compartment is furnished with doors or other openings through which the dust and other matter passing into the compartment may be blown out or may be collected and removed in any convenient manner. The effect of this arrangement is that dust and other matter rising with the separated fibers may be segregated from the fiber-laden air current rising through the machine, and the purification of the detached fibers carried out continuously as part of the process.

The invention will be described with reference to the accompanying diagrammatic drawing which represents a vertical section of one form of defibrating apparatus adapted for carrying out the improved method.

The apparatus, as illustrated in the drawing comprises a defibrating chamber $a$ which may be of upright conical form, with a fixed lower end $a'$. The inner surface of the chamber side wall may be smooth or rough, or furnished with fixed or adjustable arms $a^2$ or the like which project inward and may be smooth or rough or corrugated and serve to prevent the seed or material to be treated, being simply whirled around in the chamber. In the defibrating chamber is a rotating member $b$ operated by a shaft $c$ that passes through the lower end of the defibrating chamber and can be rotated in any convenient manner. The member $b$ attached to the shaft $c$ may be of a disk-like form and may be adapted to carry a number of upstanding arms $d$ that may be fixed or adjustable and serve as supports for the defibrating devices $e$.

These upstanding arms may be inclosed by a casing or drum $f$, which is closed by a flat or conical top $f'$.

Each supporting arm may carry one or more devices $e$ which may be arranged relatively to one another in any desired way and be of any size or shape.

On the top of the defibrating chamber $a$ and co-axially therewith is arranged and fitted a cover or hood $h$. The lower end portion of the hood may be of larger diameter than the upper, and mounted in or on it are the sifting devices $i$ that serve as means for the escape of very short fibers and of dust or other foreign matter which may be carried up with the separated fibers, such dust and very short fibers or foreign matter tending to be expelled through the sifting devices owing to the action of the plenum of air in the machine. Such dust or short fibers may be allowed to settle within one or more compartments or chambers $i'$ formed for the purpose around the outside of the hood. In the outer wall of this compartment would be doors or shutters to permit of the removal, from time to time, of any dust or short fibers or other foreign matter deposited therein.

Dependent within the hood or cover $h$ with its lower end opening into the chamber $a$ and arranged perferably centrally in relation thereto, is a tube or conduit $j$. The material to be treated may be introduced into the interior of this conduit directly or by means of a tube or similar apparatus communicating with the outside of the defibrating chamber. The portion of the conduit passing down through the hood and terminating at a suitable level with respect to the upper part of the defibrating chamber $a$ is of such a size that a clear annular space or chimney $k$ is formed between it and the inner surface of the hood through which the fibers detached in the chamber are carried by the plenum of air caused by the operations involved in defibrating the material. This annular space $k$ is at its lower end open to the interior of the defibrating chamber and communicates through its upper end with any conveniently shaped compartment or chamber $l$ in which the fiber issuing from the chamber $a$ is deposited.

The conduit $j$ may be supported in any suitable manner, for instance, by means of brackets $m$ fixed to the top of the defibrating chamber $a$.

In the walls of the fiber-depositing compartment $l$ are provided openings $n$ through which the induced current of air above alluded to escapes, such openings being covered with wire gauze or arranged in any suitable manner so as to admit of the escape of the air while avoiding as far as possible the escape of the fibers.

Suitable means may be adopted for removing the collected fiber in the depositing chamber $l$ continuously or at intervals, or it may be removed manually.

In a defibrating operation, the rotatable member $b$ and the defibrating devices $e$ are set in motion, whereupon the seeds or other material to be defibrated are fed into the conduit $j$, and are delivered to the defibrating chamber $a$ and are impelled radially outward toward the wall of the chamber by centrifugal force and subjected to the action of the devices $e$. During their passage through the machine the seeds are retarded in their movement while being acted upon by the devices $e$. Uner the action of the rotating element $b$, the devices $e$ and the whirling material, air flows naturally down through the conduit $j$ and also through the openings $c'$. The air entering by the conduit $j$ will strike the top $f'$ of the casing $f$ and then flow as indicated by the arrows $q$ outwardly and upwardly through the annular space $k$. The air entering through openings $c'$ will as the inertia $b$ rotates flow at first radially outward below the devices $e$ and then upwardly carrying with it the detached fibers. On its passage through the annular space $k$ the current of air laden with fiber and dust delivers dust and very fine fibers through the sifting devices to an extent determined by the nature thereof. In this manner a cleaning of the detached fibers is effected. The cleaned fiber may be deposited in the fiber-depositing chamber $l$, the air escaping through the apertures $n$ thereof. A little of the air may pass out through the sifting devices $i$, but the greater part catches up and carries along the detached fibers into the fiber depositing chamber $l$.

The defibrated material finds its way out through a suitably arranged outlet $o$ provided for the purpose in the bottom or side wall of the defibrating chamber.

The walls of the hood should be of such a height that no defibrated seeds or material will be lifted by the outgoing current of air sufficiently to pass over the top of the walls and be carried into the fiber-depositing chamber $l$.

Having thus described the nature of the said invention and the best means I know of carrying the same into practical effect, I claim:—

A method of defibrating cotton seed and other fiber bearing material, and segregating the detached fibers and freeing them from dust or other foreign matter, which consists in causing the material to be treated to pass through a defibrating zone under the action of gravity and centrifugal force, the movement of the material through such zone being retarded in proportion to the degree to which it is desired to remove the fibers thereon, the detached fibers being carried away by a suitably directed plenum of air flowing around and through the mass of material under treatment in a direction opposed to that in which defibrated portions of the material move toward a convenient point of discharge, any dust or other foreign matter held in suspension with the detached fibers in the said plenum of air being expelled after the fibers have left the said zone, the dust or other foreign matter being delivered apart from the fibers; the whole process of defibrating and of segregating the defibrated material, the detached fibers, and any dust or other foreign matter, being performed in a continuous manner, and the formation of the plenum of air being due solely to the operations involved in defibrating the material.

In testimony whereof I have signed my name to this specification in the presence of two subscribing witnesses.

EDWARD CARSTENSEN DE SEGUNDO.

Witnesses:
C. S. HOPKINS,
W. J. SKERTEN.